Figure 1:
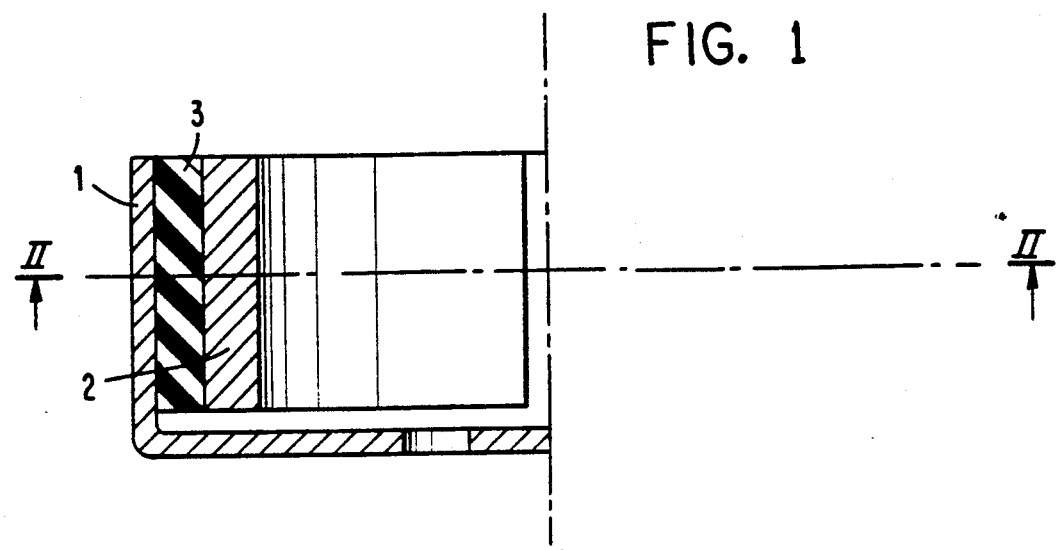

United States Patent [19]

Wolf et al.

[11] Patent Number: 5,036,726
[45] Date of Patent: Aug. 6, 1991

[54] TORSIONAL-VIBRATION DAMPER

[75] Inventors: Franz J. Wolf; Hubert Pletsch, both of Bad Soden-Salmunster, Fed. Rep. of Germany

[73] Assignee: WOCO Franz-Josef Wolf & Co., Fed. Rep. of Germany

[21] Appl. No.: 469,564
[22] PCT Filed: Jul. 22, 1988
[86] PCT No.: PCT/EP88/00663
§ 371 Date: Apr. 16, 1990
§ 102(e) Date: Apr. 16, 1990
[87] PCT Pub. No.: WO90/01126
PCT Pub. Date: Feb. 8, 1990
[51] Int. Cl.$^5$ .............................................. F16F 15/10
[52] U.S. Cl. ................................................... 74/574
[58] Field of Search .................................. 74/574, 572

[56] References Cited

U.S. PATENT DOCUMENTS

| | | | |
|---|---|---|---|
| 3,314,304 | 4/1967 | Katzenberger et al. | 74/574 |
| 3,559,502 | 2/1971 | Lofthouse | 74/574 |
| 3,606,802 | 9/1971 | Tsunodo | 74/574 |
| 4,224,835 | 9/1980 | Bauer | 74/574 |
| 4,873,888 | 10/1989 | Matsuyama | 74/574 |

FOREIGN PATENT DOCUMENTS

| | | |
|---|---|---|
| 1997151 | 2/1967 | Fed. Rep. of Germany . |
| 3535803 | 9/1986 | Fed. Rep. of Germany . |
| 3529687 | 3/1987 | Fed. Rep. of Germany . |
| 58-146745 | 9/1983 | Japan . |

Primary Examiner—Rodney M. Lindsey
Attorney, Agent, or Firm—Lowe, Price, LeBlanc & Becker

[57] ABSTRACT

A torsional-vibration damper comprises three concentric ring elements being a hub ring, a flywheel ring and an elastic ring. The flywheel ring is mounted radially inside the hub ring and inside the elastic ring mounted between the hub ring and the flywheel ring. The operating frequency of the torsional-vibration damper is thereby dependent on anguular speed such that as the angular speed increases, the effective operating frequency of the tornsional-vibration damper is shifted higher by increased stiffening of the elastic link between the flywheel ring and the hub ring due to the centrifugal force.

3 Claims, 1 Drawing Sheet

TORSIONAL-VIBRATION DAMPER

The invention concerns a torsional-vibration damper of conventional design comprising of three mutually concentric ring elements, namely a hub ring, a flywheel ring and an elastic ring, where the elastic ring—which also may be composed of individual elastic annular segments or elements—connects together the hub ring and the flywheel ring in relative elastic and rotational manner.

Torsional-vibration dampers of this kin are used to absorb very specific interfering frequencies of torsional vibrations, in particular in the automotive industry. The mass and the design of the elastic ring of these known torsional-vibration dampers or absorbers are so matched to each other that the natural frequency of the torsional-vibration damper is as close as possible to the interfering vibration whereby the latter is to be canceled by the resonance vibration of the torsional-vibration damper.

This kind of torsional-vibration damping, more accurately the absorption of interfering torsional vibrations, in principle is surprisingly effective, but nevertheless entails the significant drawback that is shall be adequately effective only for one specific interfering frequency, in practice only for a very narrow frequency band. In those instances when the interfering frequencies are not fixed, but instead drift or occur not as a sharply defined frequency, instead as a band of interfering frequencies, torsional-vibration dampers of the above kind, based on the resonance effect, offer only very unsatisfactory results.

Because torsional-vibration dampers of the above kind are widely used to absorb interfering torsional vibrations in the drive trains of motor vehicles and because these interfering torsional vibrations significantly depend in their frequencies on the engine angular speed, many attempts clearly have already taken place to develop torsional-vibration dampers of the above kind that shall be able to absorb more than one resonant frequency.

Illustratively the German Gebrauchsmuster 19 97 151 U1 discloses a torsional-vibration damper of a closed design which by means of different flywheels attempts to set up a series of resonant-vibration systems that shall become actively absorbing at the corresponding interference frequencies. Because the individual vibration systems interact, i.e. they are a coupled system, the practically useful tuning of this vibration damper remains questionable. Moreover the design of this torsional-vibration damper entails a comparatively large weight and critical manufacturing costs for mass production.

The German patent 35 35 803 C1 discloses a torsional-vibration damper which contrary to the known, above described one changes not the masses of the resonant vibration system but instead the spring force transmitted into the vibration system in two discrete steps in such a manner that the torsional-vibration damper comprises two marked resonant frequencies. However the problem of a wide frequency band or of an interfering frequency drifting with the angular speed of the engine shaft is not yet solved by creating a torsional-vibration damper with two resonant frequencies, but in principle this damper being of simple, rugged and economical design, offers two resonant and thereby absorbing frequencies which in any event are better than one. The significant drawback of this torsional-vibration damper known from the German patent 35 35 803 C1 is in the purely mechanical field. The second resonance of higher frequency is being impressed on the absorption system in that at higher angular speeds of the engine shaft seating the damper, additional springs equipped with centrifugal masses are additionally made to connect frictionally with the flywheel. The spring constant so raised of the elastic ring causes the second and higher resonant frequency. The basic drawback of this system however is the wide transition range between the slippage friction of the additional spring elements actuated by centrifugal force and the onset of static friction, i.e. the actual frictional connection which is the basis of the increase in the spring constant in the zone of the second resonance. This wide slippage range entails rapid wear of the rubbing rubber surfaces of the elastic ring and unsatisfactory life of the characteristic features of the known torsional-vibration damper.

Based on this state of the art, it is the object of the present invention to create a torsional-vibration damper of the above species which no only covers one, two or a slight number of specific resonant frequencies, but instead provides a wide and continuous band of interfering frequencies.

Accordingly the basic concept of the invention is not to arrange the flywheel-ring proper of the torsional-vibration damper externally around the hub ring and the elastic ring, which would be in the form of an effectively closed flywheel element, but instead to relocate it radially inward, that is as the innermost flywheel ring of the torsional-vibration damper, to be followed in the radially external direction by the elastic ring and lastly the hub ring. By means of the design of the invention of at least two parts for the inner flywheel ring, the flywheel elements of this ring are increasingly loaded in the radially outward direction as the angular speed of the shaft on which this torsional-vibration damper is mounted increases. This entails increasing stiffening of the springs, which mostly are rubber springs, of the elastic ring and thereby to continuous increase dependent on the angular speed in the resonant, torsional-vibration frequency of the torsional-vibration damper. As a result the requirements arising in the automotive industry for absorbing interfering vibrations within a fairly wide frequency band shall have been met.

To achieve the desired effect of raising the absorption frequency, itself function of the angular speed, i.e. raising the effective frequency of the torsional-vibration damping, the torsional-vibration damper of the invention inherently requires as a minimum that the flywheel ring be divided into two, whereby the two flywheel parts mounted diametrically and symmetrically relative to each other can actually move radially outward due to the centrifugal force and thereby can bring about the pressure deformation of the elastic ring elements and on account of this deformation the stiffening of these elastic ring elements, whereby the resonant frequency of the resonant frequency system of the torsional-vibration damper is continuously raised, thus leading to the effective absorption frequency. In principle it is not required that the flywheel ring be divided only into this one pair of flywheel parts, instead this ring may comprise two, three or also several pairs of flywheel parts which together form one rotating flywheel ring. The pairs of flywheels then preferably shall evince masses which differ pairwise in such a manner that the increase in resonant frequency caused by the spring stiffening shall be increased by them in the same sense. In this regard elastic ring segments of different sizes also may be designed which in principle may act to increase the characteristic line as well as lowering the strongly pronounced centrifugual effect.

The invention is elucidated below by means of illustrative embodiments and in relation to the drawings.

Figure 2:
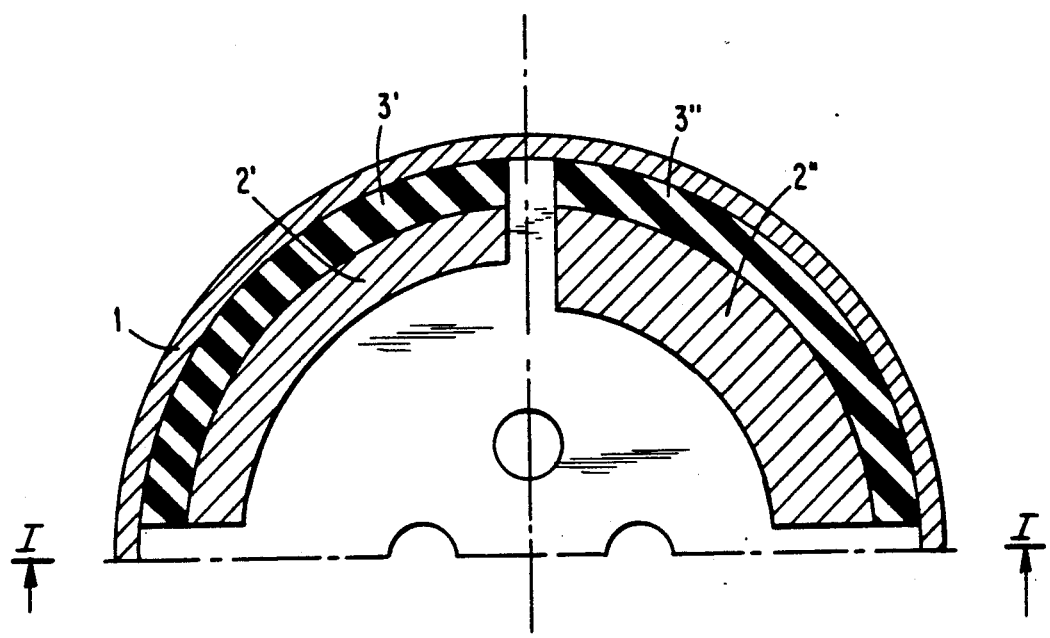

FIG. 1 is an illustrative embodiment of a torsional-vibration damper shown in part and in axial section along I—I of FIG. 2, and FIG. 2 is a section along II—II of FIG. 1.

The torsional-vibration damper shown in part in the Figures in axial and radial sections consists of three mutually concentric ring elements, namely a hub ring 1, a flywheel ring 2 and an elastic ring 3, where the latter links the hub ring 1 and the flywheel ring 3 in an elastic and mutually rotating manner.

However, contrary to the case for the known absorbers, the torsional-vibration damper or absorber of the invention places the flywheel ring 2 radially inside whereby a structure is obtained from the radial inside to the radial outside for which the flywheel ring 2 is innermost, being followed by the elastic ring at the center, and the actual hub ring 1 follows as the outer ring. In addition to this first essential feature of the torsional-vibration damper of the invention, it also evinces a second essential feature in that the flywheel ring 2 is divided into at least two identical, namely two equally large and equally heavy segments, this minimum division of the flywheel ring making is possible that a high angular speeds the flywheel ring shall not be symmetrically centered but the segments or parts of the flywheel ring 2 shall be increasingly pulled radially outward by the centrifugal force. This leads to compressing the elastic spring in the radial direction and thereby—in particular when a rubber spring is used—to a substantial increase in the elastic spring's spring constant, i.e. to a "stiffening" of the spring, where this spring elastically connects in rotational manner the flywheel ring and the hub ring.

As shown in FIG. 2, a segmented flywheel ring 2', 2" need not consist at all of merely identical flywheel ring segments 2' or 2", rather it may consist of flywheel parts 2'2" of different masses each time arrayed to be mutually opposite in pairs or as individual segments. The sole critical aspect is that the individual flywheel parts of the flywheel ring be mutually opposite pairwise in identical pieces to prevent absorber imbalances even at higher angular speeds.

In lieu of using flywheels of different masses as shown in FIG. 1, the tuning of the resonant fundamental frequency of the individual segments obviously can be carried out for identical masses of the individual flywheel weights in that the individual elastic ring segments 3', 3" evince different hardnesses based on the material and/or, based on design, evince different thicknesses in the radial direction. Thereby as well, on account of the different spring constants of the elastic spring segments and different masses of the flywheel ring segments, it shall be possible to provide the torsional-vibration damper of the invention not only with one marked fundamental frequency relative to the angular speed, but with two or more, without thereby incurring undue bulk and undue weight.

Again as regards the design of the torsional-vibration damper shown as an illustrative embodiment in FIG. 2 or its reverse design discussed above, the significant factor again is that the individual flywheel segments cause increasing compressive deformation of the rubber-spring ring segments as the absorber's angular speed increases, whereby the rubber spring of the vibration system is made stiffer, so that in turn the resonant frequency or frequencies of the absorber increase(s) in the desired manner as the angular speed increases.

This design makes the torsional-vibration damper of the invention especially relevant to automotive engineering wherein the interfering frequencies at least to the first approximation are raised together with the angular speed of the drive shaft, and thereby, under normal operating conditions, also the interfering frequencies.

We claim:

1. A torsional-vibration damper, comprising three concentric ring elements including a hub ring (1), a flywheel ring (2), and an elastic ring (3), said elastic ring linking together in an elastic and relatively rotational manner the hub ring and the flywheel ring, said flywheel ring (2) being mounted radially inside the hub ring (1) and including at least four segments being at least two pairs of mutually diametrically opposite flywheel parts (2', 2") having pairwise different masses.

2. A torsional-vibration damper defined in claim 1, wherein the elastic ring (3) comprises at least four segments of an elastomer material and at least one diametrically mutually opposite pair of said elastic ring segments (3', 3") have thicknesses and/or spring characteristics that differ pairwise.

3. A torsional-vibration damper comprising three concentric ring elements including a hub ring (1), a flywheel ring (2), and an elastic ring (3), said elastic ring linking together in an elastic and relatively rotational manner the hub ring and the flywheel ring, said flywheel ring (2) being mounted radially inside the hub ring (1) and including at least four segments, wherein at least two pairs of mutually opposite elastic ring segments (3', 3") have thicknesses and/or spring characteristics that differ pairwise.

* * * * *